US009274765B2

(12) United States Patent
Thomson et al.

(10) Patent No.: US 9,274,765 B2
(45) Date of Patent: Mar. 1, 2016

(54) SPATIAL GRAPHICAL USER INTERFACE AND METHOD FOR USING THE SAME

(75) Inventors: Stephen C. Thomson, Jersey City, NJ (US); Peter E. Albu, Riverdale, NY (US)

(73) Assignee: Drawing Management, Inc., Jersey City, NJ (US)

( * ) Notice: Subject to any disclaimer, the term of this patent is extended or adjusted under 35 U.S.C. 154(b) by 552 days.

(21) Appl. No.: 12/315,029

(22) Filed: Nov. 26, 2008

(65) Prior Publication Data

US 2010/0131903 A1 May 27, 2010

Related U.S. Application Data

(63) Continuation of application No. 11/433,631, filed on May 12, 2006, now abandoned.

(60) Provisional application No. 60/680,201, filed on May 12, 2005.

(51) Int. Cl.
*G06F 3/0481* (2013.01)
*G06F 9/44* (2006.01)

(52) U.S. Cl.
CPC ........................................ *G06F 8/38* (2013.01)

(58) Field of Classification Search
CPC ......... G06F 3/00; G06F 3/048; G06F 3/0481; G06F 8/38; G06F 9/4443; G06F 17/24; G06F 17/30864; G06F 17/30554; G06F 17/30286; G06Q 10/10
USPC ......... 715/764, 765, 768, 835, 846, 847, 205; 707/1, 104.1, 705, 769, 805
See application file for complete search history.

(56) References Cited

U.S. PATENT DOCUMENTS

| 4,972,319 | A | | 11/1990 | Delorme | 364/419 |
|---|---|---|---|---|---|
| 5,278,946 | A | | 1/1994 | Shimada et al. | 395/62 |
| 5,329,464 | A | | 7/1994 | Sumic et al. | 364/512 |
| 5,377,102 | A | | 12/1994 | Nishiishigaki | 364/420 |
| 5,448,696 | A | | 9/1995 | Shimada et al. | 395/161 |
| 5,543,788 | A | | 8/1996 | Mikuni | 340/990 |
| 5,577,188 | A | * | 11/1996 | Zhu | 715/745 |
| 5,592,663 | A | | 1/1997 | Nagamori | 395/605 |
| 5,900,859 | A | | 5/1999 | Takishita et al. | 345/113 |
| 5,930,799 | A | | 7/1999 | Tamano et al. | 707/102 |

(Continued)

OTHER PUBLICATIONS

Bloomsburg University Virtual Training Help Center, "ImageReady", 2001, Lessons 3 and 6.*

(Continued)

*Primary Examiner* — Xiomar L Bautista
(74) *Attorney, Agent, or Firm* — Whitmyer IP Group LLC

(57) ABSTRACT

A spatial graphical user interface for interfacing with a plurality of data sources to create a layered image includes a content acquisition module configured to acquire a first primary image from any one of the data sources where the primary image has at least an image of one object thereon. A transparent layer generating module generates a transparent layer to be overlaid over the primary image which spatially corresponds to the primary image. A link generating module generates an icon on the transparent layer over the at least one object such that the icon represents a link to data contained in the data sources related to the object on the primary image. The layered image is the combined view of the primary image, the transparent layer and icons on the transparent layer.

8 Claims, 12 Drawing Sheets

(56) References Cited

U.S. PATENT DOCUMENTS

| | | | |
|---|---|---|---|
| 5,978,816 A | 11/1999 | Sakaguchi et al. | 707/501 |
| 6,032,157 A | 2/2000 | Tamano et al. | 707/104 |
| 6,456,298 B1 | 9/2002 | Kunimasa et al. | 345/629 |
| 6,523,024 B1 | 2/2003 | Yajima et al. | 707/3 |
| 6,792,417 B1 | 9/2004 | Mochizuki | 707/3 |
| 7,337,396 B2* | 2/2008 | Rosenholtz et al. | 715/273 |
| 7,559,034 B1* | 7/2009 | Paperny et al. | 715/803 |
| 7,797,431 B2* | 9/2010 | Franklin et al. | 709/227 |
| 7,949,943 B2* | 5/2011 | Michaud et al. | 715/234 |
| 2002/0029226 A1 | 3/2002 | Li et al. | 707/104.1 |
| 2002/0101447 A1* | 8/2002 | Carro | 345/760 |
| 2003/0046401 A1 | 3/2003 | Abbott et al. | 709/228 |
| 2004/0066316 A1* | 4/2004 | Ogawa | 340/995.1 |
| 2004/0117347 A1 | 6/2004 | Seo et al. | 707/1 |
| 2004/0119759 A1* | 6/2004 | Barros | 345/853 |
| 2004/0139103 A1 | 7/2004 | Boyce et al. | 707/102 |
| 2004/0215659 A1 | 10/2004 | Singfield et al. | 707/104.1 |
| 2004/0225968 A1 | 11/2004 | Look et al. | 715/778 |
| 2005/0010875 A1* | 1/2005 | Darty et al. | 715/768 |
| 2005/0041150 A1 | 2/2005 | Gewickey et al. | 348/565 |
| 2005/0044091 A1 | 2/2005 | Nakamura et al. | 707/100 |
| 2008/0091461 A1* | 4/2008 | Evans et al. | 705/1 |

OTHER PUBLICATIONS

Kenneth W. Umbach, "What is 'Push Technology'?", Oct. 1997, California Research Bureau, CRB Note vol. 4 No. 6, pp. 1-18.*

* cited by examiner

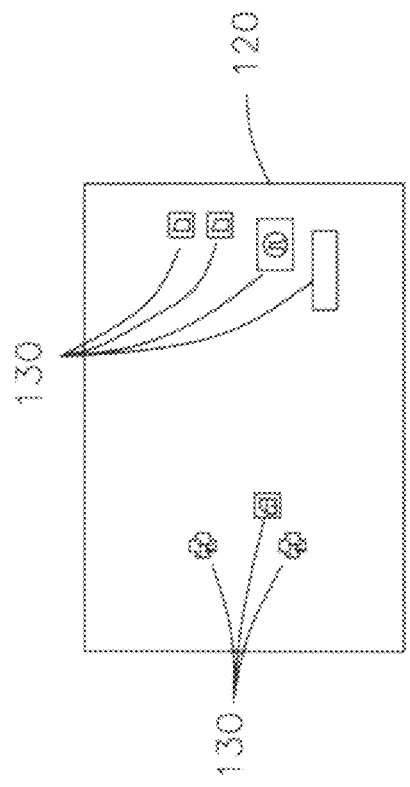
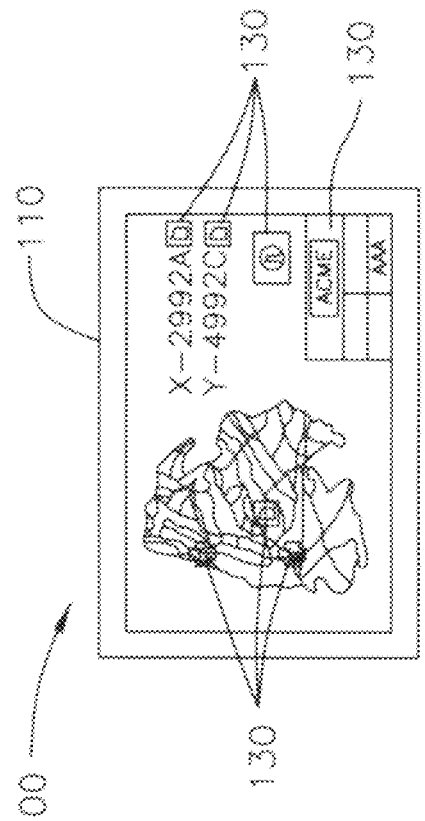

SPATIAL GRAPHICAL USER INTERFACE AND METHOD FOR USING THE SAME

RELATED APPLICATION

This patent application is a continuation of U.S. patent application Ser. No. 11/433,631, filed on May 12, 2006, now abandoned, which in turn claims the benefit under 35 U.S.C §119(e) of U.S. Provisional Patent Application No. 60/680,201, filed May 12, 2005.

FIELD OF THE INVENTION

The present invention is related to a spatial graphical user interface. More particularly, the present invention is related to a spatial graphical user interface for linking information or documents to other documents.

BACKGROUND OF THE INVENTION

In the field of data management, particularly in larger corporations, it is not uncommon for number of legacy data bases and document repositories to be maintained, each of which operates using different architectures. Furthermore, in the case of engineering drawings, maps or other similar drawings used by utility companies, the basic image files are often non-intelligent raster format drawings or are otherwise not in a format suitable for easy modification.

However, there is need to integrate disparate files such as (maps, drawings, image files, text files, sensor information, GPS data, etc. . . . ) into a single file so that once a first file is retrieved, other files corresponding to objects on that first file can also be easily retrieved. For example, in the case of an engineering drawing, there can be hundreds if not thousands of objects on a single image, each of which has corresponding data on file in the system, such as additional sub-images, text files etc. . . . . However, in many cases, the first image file can not be modified to add links to these related data files.

Traditional data integration solutions require that the current software applications be replaced with already integrated alternatives as in the case of Enterprise Resource Planning (ERP) solutions, or very costly, time consuming integration code must be written to get separate application software and associated data to work together.

Additionally, standard Computer Aided Design (CAD) and Geographic Information Systems (GIS) typically require a vector rather than a raster format for drawings and maps to be used. Also, prior art systems require the user to work in the native file format of the image document that is being overlain.

OBJECTS AND SUMMARY OF THE INVENTION

The present invention overcomes the drawbacks associated with the prior art and provides a system and method for integrating disparate information sources in the form of documents, data or application software and linking them to icon locations on a transparent digital layer that overlays a primary image document, where the transparent layer and links are separate from and not embedded within the primary document. Most image document formats are supported, whether they are raster, vector or other basic non-coded images such as drawings, maps, text, spreadsheets, graphs, charts, photographs, diagrams, and schematics. The transparent digital layer is related to the underlying primary document image by either a local or global coordinate system. The link icon locations and relationships are managed and stored in a separate system database.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIGS. 5A-5C are diagrams of a primary image, transparent layer and layered image generated on the system of FIG. 1, in accordance with one embodiment of the present invention;

DETAILED DESCRIPTION

Figure 1:
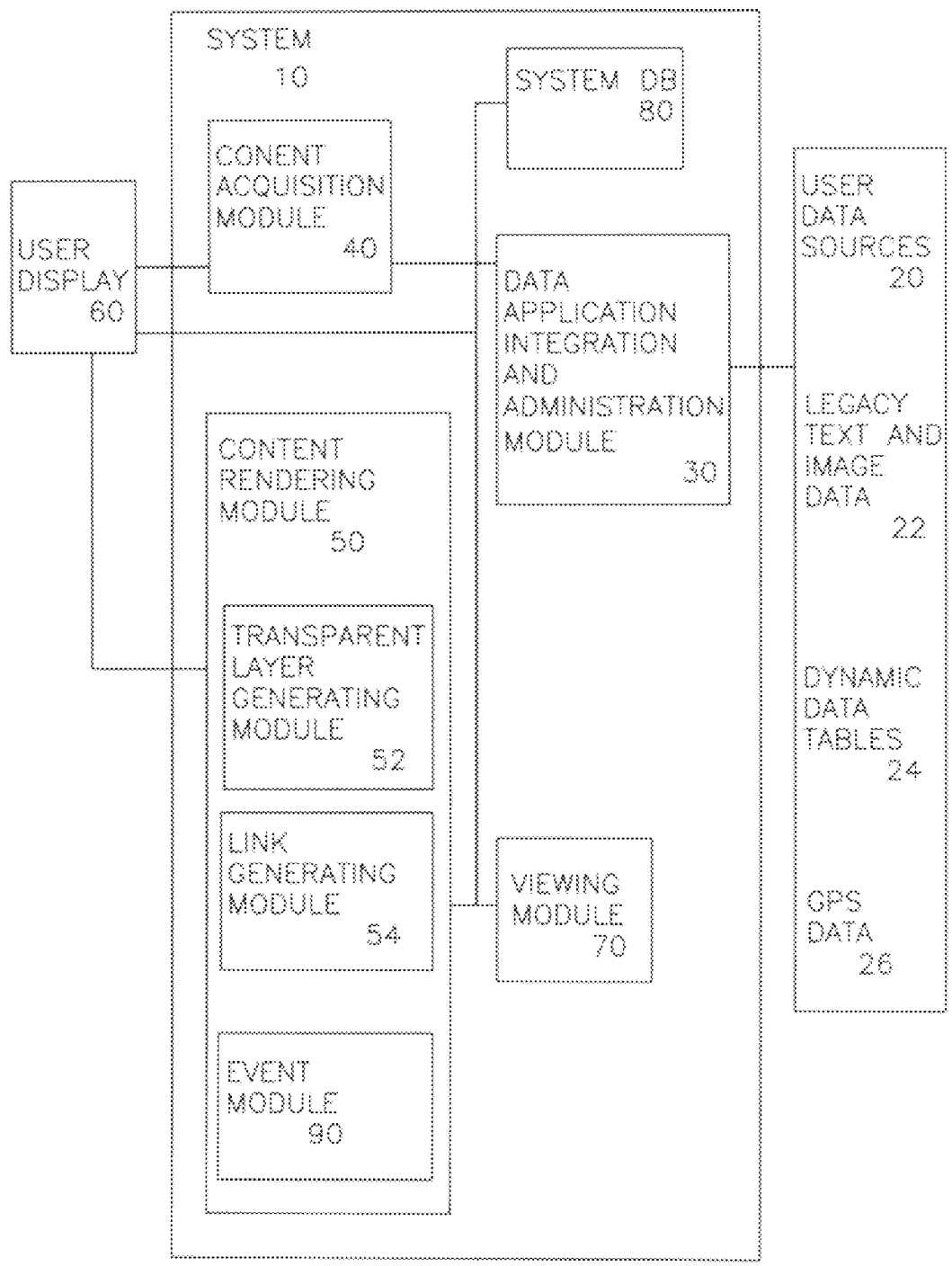
FIG. 1 is a system block diagram of the a spatial graphical user interface system, according to one embodiment of the present invention.

In a first embodiment of the present invention illustrated in FIG. 1, a spatial graphical user interface system 10 is shown. As discussed in more detail below, system 10 allows a user to retrieve a primary image, such as a map, chart, image or other spatial representation from data sources 20, and then generate a transparent layer or grid to be overlaid upon and registered to the underlying primary image. The transparent layer generated by system 10 then serves as a platform for arranging and linking to data, again from legacy data sources 20, corresponding to certain locations or objects on the underlying image, without the need for modifying or re-processing the underlying primary image.

As illustrated in the accompanying figures, the present invention maintains the ability to create a transparent digital layer that can be overlaid upon and registered to a large number of document image formats. Each such transparent digital layer can contain an unlimited number of link icons (or "links"), which can address any number of corresponding legacy and new information sources, including documents, data and software applications, located within a corporate information environment or across web connections, whether they be wired or wireless connection. Registration of the transparent layers and the placement of the link icons can be done based either on a local (to the image) coordinate system or to a global coordinate system such as latitude and longitude, provided the primary image document is geo-coded. The link icons are completely separate from and not embedded within the primary image documents over which they are laid. However, the links may be, and typically are, visually related to a particular location or object on the underlying document image by the user.

Figure 2:
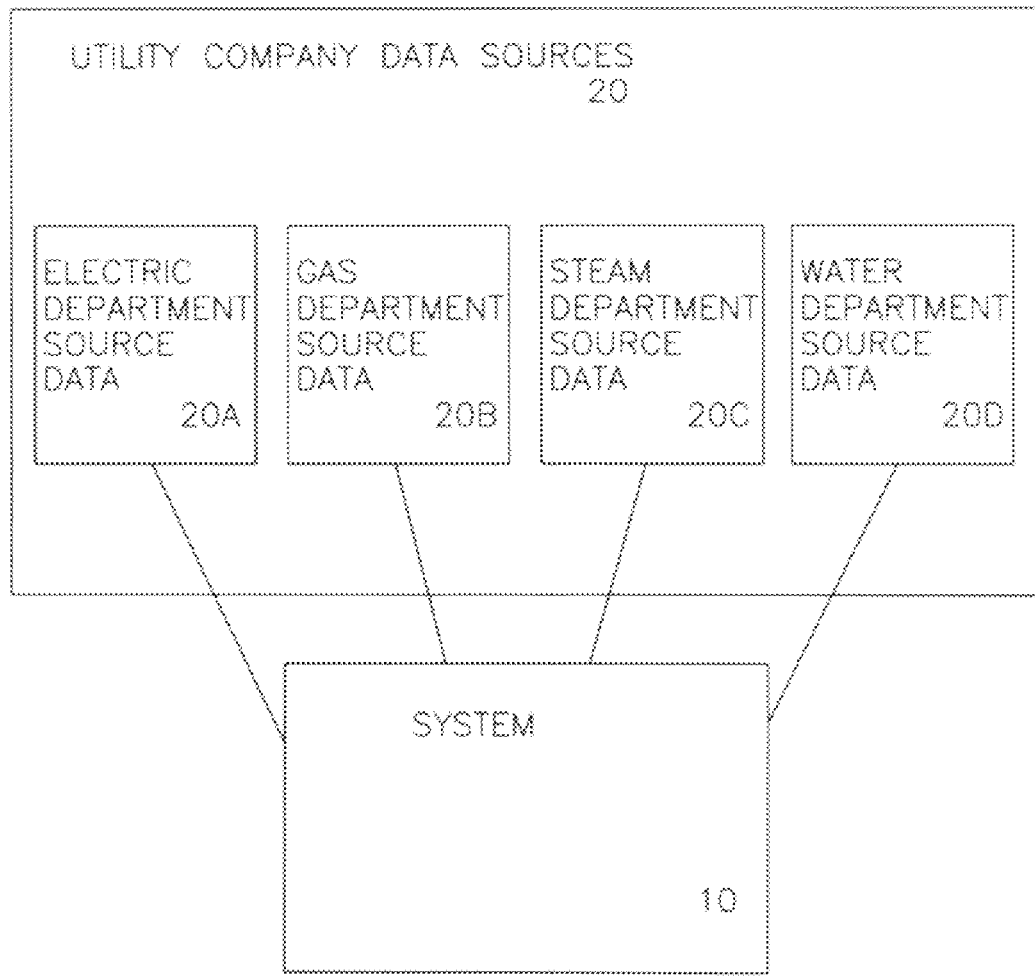
FIG. 2 is a block diagram of the spatial graphical user interface system from FIG. 1 applied in a particular application, in accordance with one embodiment of the present invention.

In accordance with one embodiment of the present invention, and in order to illustrate a typical installment utilizing system 10 and to facilitate further exemplary discussion of the present invention, FIG. 2 illustrates an arrangement of system 10 coupled to a series of legacy data sources 20 that may occur in a real word setting. For example, in this arrangement the user is a utility company having a plurality of existing legacy databases/data sources 20. Each data source 20 may be maintained by a separate department within the larger company. These data sources 20 are potentially each running on separate non-compatible proprietary or commercial software. Furthermore, data contained on each of the systems may be of a format not capable of easy manipulation or rendering. It is understood that this arrangement is for exemplary purposes and is in no way intend to limit the scope of the present invention.

For example, a first power department 20a may have existing data of images and text. The images files are non-linkable raster image files and furthermore, the data is stored in a manner non-compliant with the existing data architecture on a gas department data sources 20b, steam department data sources 20c, water department data sources 20d etc. Reworking: 1) the image files into modifiable smart images, capable of incorporating embedded links; and 2) the data architecture of data sources 20a-20d into compatible formats, is extremely time consuming and expensive and in many cases is simply impossible, as the departments may not wish to have their data altered.

The present system 10 is thus connected to data sources 20a-20d allowing a first primary image from each one of the data sources 20 to be retrieved, spatially registered against a system generated transparent layer, and have links to related or corresponding data placed on the transparent layer, without having to re-format or re-configure any of the existing legacy data (primary image or linked data) from data sources 20. Additional examples of implementations of system 10 are discussed below during the detailed description of the operation.

To this end, in accordance with one embodiment of the present invention as illustrated in FIG. 1, system 10 employs among other elements, a content acquisition module 40, a content rendering module 50, a transparent layer generating module 52, a link generating module 54, a data application integration module 30, a system database 80, a viewing module 70 and an event module 90. Below is a description of the elements of system 10 and other user components that are involved in the process of primary image retrieval, transparent layer generation and link generation. It is understood that the following descriptions are by way of example only, and are in no way intended to limit the scope of the present invention. Any similar system 10 for generating a link layer overlaid over a primary image document as discussed below, employing similar modules is within the contemplation of the present invention.

Figure 3:
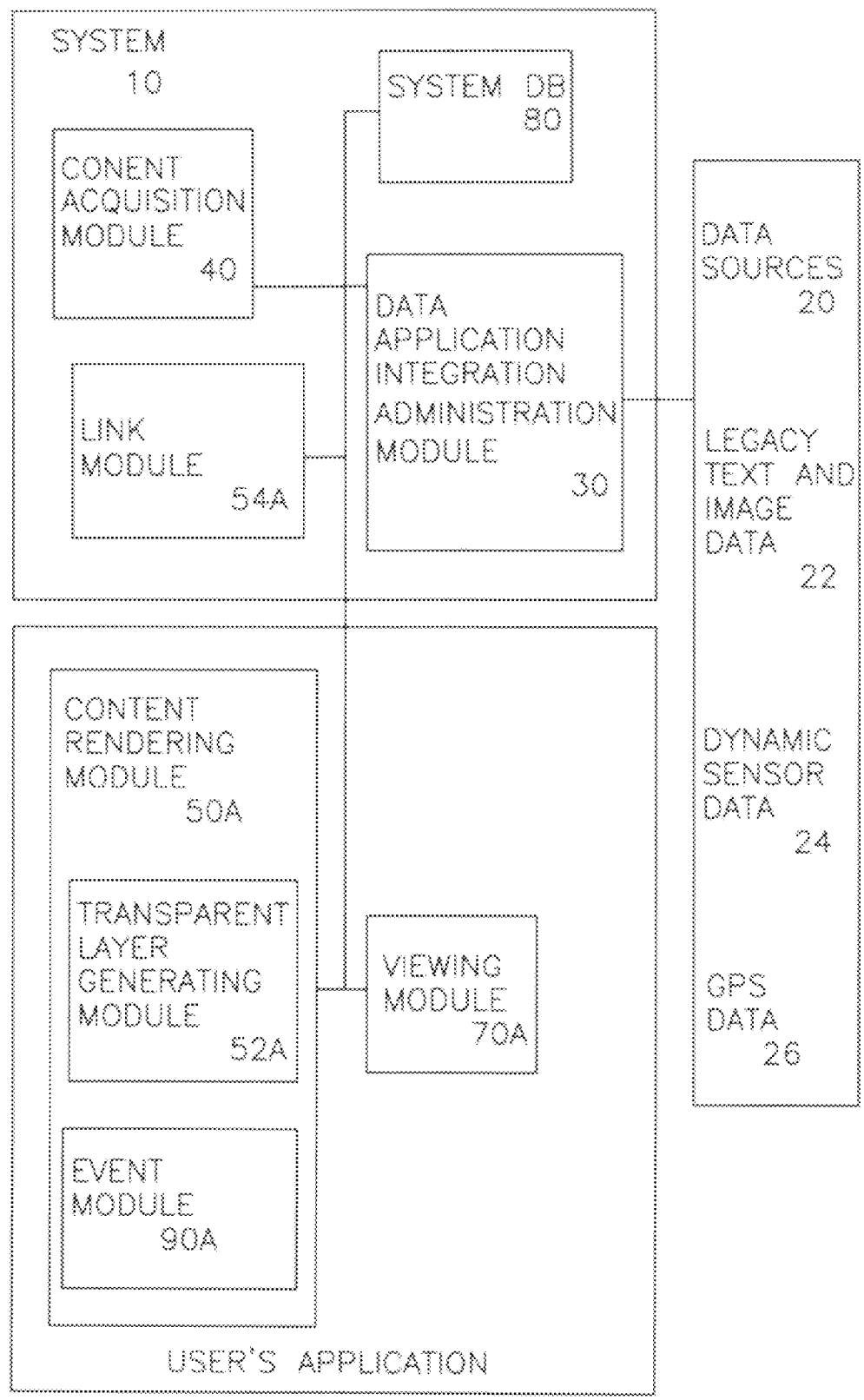
FIG. 3 is a system block diagram of an alternative arrangement for the spatial graphical user interface system of FIG. 1, according to one embodiment of the present invention.

For example, in another embodiment of the present invention, FIG. 3 illustrates an alternative arrangement for system 10, where instead of display module 60 being the user interface, a content rendering module 50a and viewer integration module 70a are located external to system 10 on a user's internal computer systems. Here the transparent layer generating module 52a portion of content rendering module 52a is removed to the user's internal computer systems and link generating module 54a remains within system 10 to handle link relationships, and other link generation functions, apart from directly rendering the content of the links and supporting the transparent layer. For the purposes of illustrating the salient features of the present invention, the modules as shown in FIG. 1 are used.

Spatial graphical user interface system 10 of the present invention is contemplated as a server having a number of functional modules therein that are coupled to legacy data sources 20, as shown in FIGS. 1 through 3. It is understood however, that system 10 may simply be in the form of an application installed on existing computers either within or external to a user's existing computer architecture. Furthermore, modules listed independently on FIGS. 1 and 3, and discussed as such below, may be combined into larger multi-function modules as desired or moved as certain legacy data source architecture and user requirements dictate.

Data sources 20 refer to existing databases managed by the user. Broadly, any data, either image, text or executable programs, that are to be the subject of a transparent layer rendering (primary image) or are to be linked to from such a transparent layer are referred to throughout as existing or legacy data. Data sources 20 are the sources of the compilation of all such data. FIGS. 1 through 3 are not intended to imply proximity of such data, merely that data sources 20 are outside of system 10 and maintain the legacy data. Data sources 20 that are located remotely, such as data handled by third party vendors are all within the contemplation of the present invention.

One such principal legacy data contained within data sources 20 generally includes text and image data 22 in various formats. The following is an exemplary list of file types contemplated for use with the present invention: DWG, AutoCAD, IDW—Inventor, DGN—Microstation, PLT—Calcomp, CGR—CATIA, SHP—ESRI, DRW—Pro Engineer, PRT—Pro Engineer & Unigraphics, SLD—SolidWorks, GBL—Gerber, CAL—CALS, COT—Intergraph, GIF—GIF, PDF—Adobe, SVG—Scalar Vector Graphics, JPG—JPEG, VSD—Visio, PPT—Powerpoint, BMP—BitMap, TXT—Text, DOC—Word, XLS—Excel, WRK—Lotus, MDB—Access, WPD—Wordperfect. This is intended as an example only and in no way intended to limit the scope of the present invention.

These files refer to images such as maps, floor plans, building plans, charts, workflows, photos and other such images, as well as data files, related to any object that may appear on or be related to one of the images. Although there are too many possible types of data to list as examples, a brief illustrative example, elaborated on below, may be an image of street map for a utility company (primary image file) and a text document listing information related to a particular manhole, power feeder, telephone/electric pole etc. . . . (text/data file that is the subject of a link) that is represented on that street map. As noted above, other data stored in data source 22, may further implement additional user proprietary and third party software.

Furthermore, in addition to standard text and image files, data sources 20 also may include dynamic data sources 24 corresponding to frequently updated or real-time information from sensors or other updating data (pump pressure indicators, weather information, release valve pressures, temperature, voltage and current variations, etc. . . . ). For example, dynamic data source 24 may include a table relating to sensor data, such as a temperature sensor. Rather than a simple static or semi-permanent data, this dynamic data source 24 constantly registers updated temperature readings from one or more temperature sensors. This data can then be accessed by system 10 in order to provide links to real-time data and events in accordance with the transparent layer and link generating process discussed below.

Yet another form of data within data sources 20 is GPS or other geographic location data 26. Location data 26 from data sources 20 may be used by system 10 to track real-time or frequently updated geographical location data of an object. For example, if a user employs GPS tracking sensors in a given object, location data 26 of data sources 20 stores the location data of the object.

The above types of data found within user's data sources 20 are merely illustrative. Any addition legacy data of the user that is used by system 10 in conjunction with the transparent layer generation and link generation discussed below is within the contemplation of the present invention.

In one embodiment of the present invention, as illustrated in FIG. 1, data application integration and administration module 30 is coupled to user's data sources 20 so as to configure the user's data, imported into system 10, into a usable format. Because a user's legacy data is typically stored in one or more commercial or proprietary formats, integration module 30 is used by system 10 to ensure that all data available to system 10 is able to be imported smoothly and worked on by content acquisition module 40 and content rendering module 50. Furthermore integration module 30 may also act as an administration module including a plug-in manager used to integrate with the existing data management systems employed on data sources 20, inheriting the user's permissions/passwords, and retrieve access files and metadata for legacy data location information. For example, potential legacy data sources 20 may operate on systems such as FileNet, Metaphase, Oracle and custom application software.

In one embodiment of the present invention, content acquisition module 40 is coupled to integration module 30 and is configured to request and retrieve data from the user's legacy data sources 20. As noted earlier, the present invention is designed to obtain a first primary image or spatial file (such as a map), generate a transparent layer overlaid over the top of the primary image and then allow a user to place links on the transparent layer, linking to other image, text, sensor data etc. . . . , relating to the primary image. Content acquisition module 40 is the component of system 10 that retrieves the data being acted upon, either the underlying primary image content or the link content from data sources 20. In this context, content acquisition module 40 is first utilized to draw up an initial image data from data sources 20 upon which to generate the transparent layer and is again used when retrieving data to be linked to on the transparent layer. Content acquisition via content acquisition module 40 may either be a manual process directed by the user, or alternatively, it may be programmed if possible, assuming the underlying primary image file contains some inherent intelligence. A detailed description of the process for data acquisition is discussed below.

Coupled to both integration module 30 and content acquisition module 40 is content rendering module 50. Content rendering module 50 is configured to process and render the transparent layer to be overlaid on the primary image file and is further configured carry out the user specified link generation. Content rendering module 50 employs both a transparent layer module 52 and a link generation module 54. Transparent layer module 52 handles the creation of and the registration of the transparent layer over the primary image. Subsequently, link generation module handles the processing related to icon generation and placement on the transparent layer as well as generation of the link to the associated data in data sources 20.

Thus, content rendering module 50 is directed by the user, to place icons or links on the transparent layer in the desired locations and further to work in conjunction with content acquisition module 40 to obtain the necessary stored data from data sources 20 for each of the links. The process for link generation is discussed in greater detail below.

In one embodiment of the present invention, display module 60 is shown in FIG. 1 as external to system 10, its status in typical settings, but it may be incorporated within system 10 itself if desired. Display module 60 is simply a display and interface for the user to interact primarily with content rendering module 50 and content acquisition module 40, allowing the user to retrieve a primary image file and generate the desired links on the overlaid transparent layer. In FIG. 3, display module 60 is incorporated into the user's application (content rendering module 50a and viewing module 70a).

Viewing module 70 is coupled to the various components of system 10, and configured to facilitate any necessary image display integration. For example, much of the legacy data in data sources 20 may be in different formats (.pdf, .tif, .dwg, svg, etc. . . . ). Furthermore, the link generation process handled by link module 54 of content rendering module 50 also maintains its own viewing software. Viewing module 70 is able to integrate the various viewing formats so that they are smoothly viewed by the user, such as on display module 60.

In one embodiment of the present invention, system database module 80 is coupled to system 10, either internally as shown in FIGS. 1 and 3, or located offsite if additional storage is desired, and is configured to store information regarding the generated links on the transparent layer. As noted above, the original primary image data as well as the legacy data that is being linked to on the overlaid transparent layer is all stored, unedited, in data sources 20 of the user. However, once a transparent layer is generated for a particular primary image and various links are placed thereon, the layer and its corresponding imprinted link data, location of links with respect to the layer image and other related data generated on content rendering module 50 are stored in the system database 80. It is understood that such data in system database 80 may alternatively be stored locally on data sources 20, but for illustrative purposes, data corresponding to the transparent layer image and links (address of data and location on transparent layer image) is considered stored in system database 80.

Events module 90 in content rendering module 50 is configured to handle links on the transparent layer image that require constant update. As noted above, some data source 20 information includes dynamic sensor data 24 and location data 26. When a link is generated to such data, events module 90 polls the data (or table containing the data) at some regular interval and updates the link. For example, in the case of a sensor data 24, if the sensor records an event that exceeds some threshold, like a temperature threshold, then events module 90, after the next timed polling of such data, may change the status of the link to indicate to the user a change in status, such as a flashing link, a change in color, or event a change in location on the transparent layer.

Figure 4:
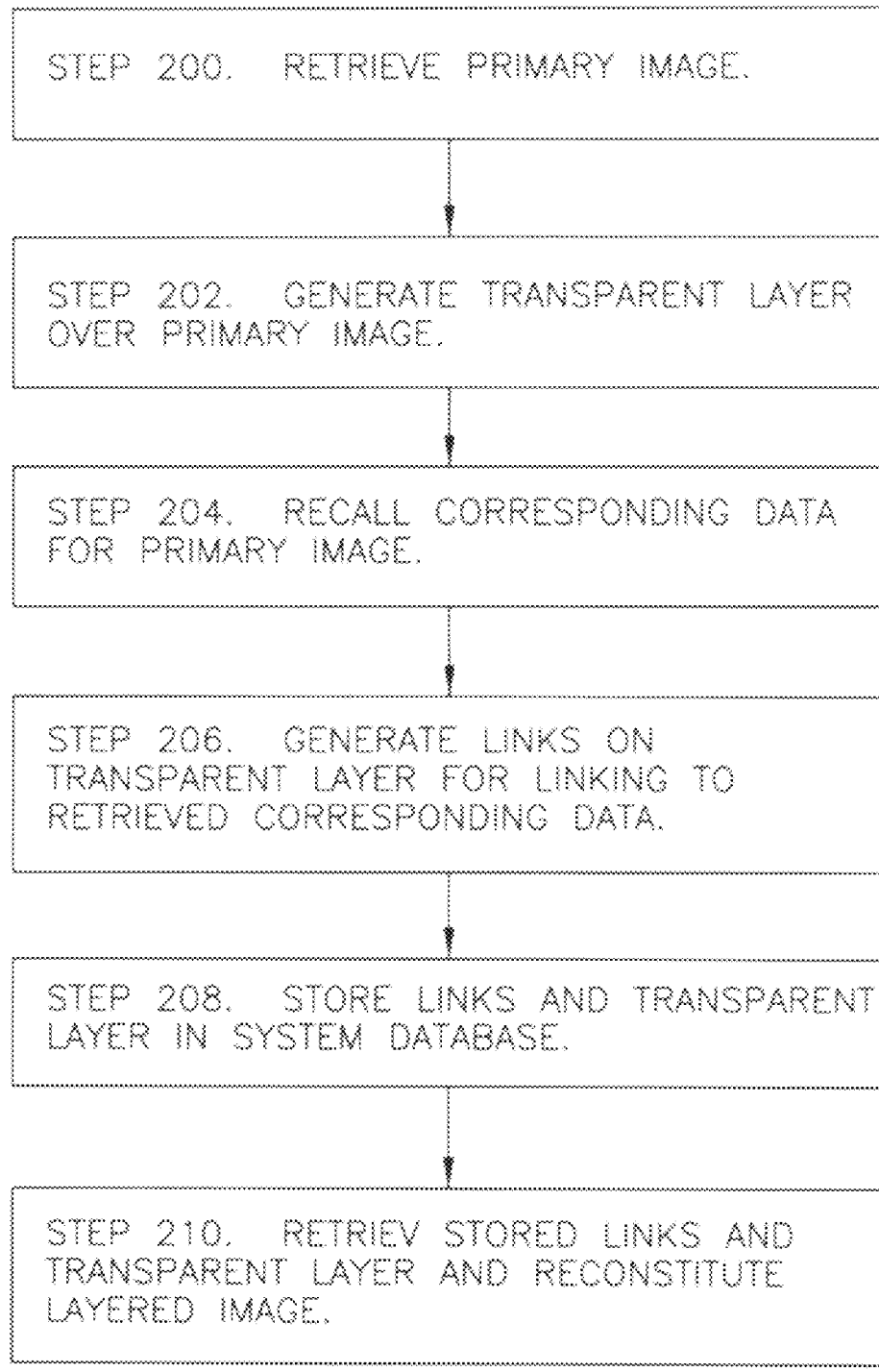
FIG. 4 is a flow chart showing the generation of a layered image using the system of FIG. 1, in accordance with one embodiment of the present invention.

Turning now to an exemplary implementation of the present invention, FIG. 4 is a flow chart of the operation of system 10, and FIGS. 5A-5C show an exemplary layered image 100 in accordance with one embodiment of the present invention. In the present invention, as discussed earlier and shown now in FIGS. 5A-5C a layered image 100 (FIG. 5C) according to the present invention is formed from an underlying primary image 110 (FIG. 5A), a transparent link layer 120 image (FIG. 5B) to be overlaid over primary image 110, and a series of links 130 disposed on transparent layer 120. As shown in FIG. 5C, transparent layer 120 with links 130 is superimposed over primary image 110 resulting in layered image 100, where links 130 appear directly over primary image 110. As discussed throughout, layered image 100 allows primary image 110 to be enhanced to include links 130 to other data related to primary image 110, such as data corresponding to objects on primary image 110, without the need to alter, rearrange, or modify the existing document structure of primary image 110. It is understood that this is intended as an exemplary model of layered image 110. However, it is understood that any similar layered image formed from a non-embedded transparent layer overlaid over a primary image is also within the contemplation of the present invention In the present example shown in FIG. 5, a municipality may have a map stored in data sources 20 as well as information concerning certain emergency responses. Thus, the map of the region is retrieved as primary image 110 and transparent layer 120 is created for placing links. The user then places links 130 on the transparent layer over such items as hospital locations, police stations etc. . . . , where the links 130 maintain addresses to other data in data sources 20 that correspond to such objects, i.e. hospital information (street address, telephone, emergency capacity, trauma level, associated ambulance services etc. . . . ) and police station information (street address, capital of station, emergency services capacity etc. . . . ) and/or links to other documents such as floor plans which then can become a new primary image.

In one embodiment of the present invention, the process for generating such a layered image 100 begins at step 200, where a user at display module 60 selects a primary image 110 from data sources 20 to be processed into a layered image 100. Content acquisition module 40 retrieves primary image 110 from legacy data sources 20 and delivers it to content rendering module 50.

Next at step 202, transparent layer module 52 of content rendering module 50 generates transparent layer 120 which is rendered over and spatially registered to primary image 110 resulting in a first primary image 110 viewable through an overlaid transparent layer 120. At step 204, a user on display module 60 then begins to retrieve link data from user's legacy data sources 20. As noted above this is data, such as text, additional images, sensor data, GPS information etc. . . . , that is related to some object on the primary image 110. At step 206, the user then begins generating links 130 on transparent layer 120 directly overtop of the particular object on primary image 110 to which the additional data corresponds. The icons used for each link 130 preferably identify/relate to the attached data. For example, if link 130 is to a data file, the icon used would preferably by in the form of a note paper, a hospital link 130 can be designated by an "H" etc. . . .

It is noted at this time that this process of generating links 130 is facilitated by link generating module 54 of content rending module 50 and can be either a manual process or an automated process. In the manual process, the user physically drags and drops the icon or link 130 on the desired location on transparent layer 120 over primary image 110 and then links to the corresponding data. In the automated process, where the primary image 110 has some intelligence, content rending module 50 may read/scan primary image 110 for certain information and drop links onto transparent layer in the corresponding locations drawing from a list of links 130 created by the user. Details of the automated and manual process are discussed in more detail below.

As illustrated in FIG. 3, at the next step 208, once the links 130 are all in place, content rending module 50 stores the transparent layer 120 and links 130 (location and address data) in system database 80. A user wishing to view a layered image on system 10 at step 210 can simply recall a primary image 110, retrieve the stored transparent layer 120 and links 130 from system database 80 so as to reconstitute layered image 100 using viewing integration module 70 and display module 60. It is understood that this process is an exemplary process for generating layered image 100. Any similar process employing similar steps and modules is also within the contemplation of the present invention.

The following are additional examples of implementations of system 10 as well as more detailed explanations of certain steps from the layered image 100 creation process outlined in FIG. 4.

Beginning with link generation step 206, as noted above, this process can be performed manually, or automatically. The manual process, in view of the above description is self explanatory. Once a user designates a primary image 110 and generates a transparent layer 120, the user can then simply recall additional data from data sources 20 that correspond to objects on primary image 110.

In one embodiment of the present invention for example, if the user is a utility service, and the primary image 110 is street map of a ten block area, then the recalled corresponding data may include but is not limited to: text files relating to manhole covers, image files (maps) of under street level feeders, text files relating to those same feeders, text files on pot heads, temperature sensor tables relating to the feeder temperatures, other text and image data relating to steam and water supply pipes from other departments, work history files for certain locations/objects, transformers, scheduling data for schedule of works performed and to be performed, etc. . . . . This data is recalled from data sources 20 using basic category search methodology, using search terms, and limits, according to how the data is stored in data sources 20. It is understood that the types of data related to an object on primary image 110 is nearly limitless. The present invention contemplates any such related data that is retrieved for the purpose of generating a link 130 on transparent layer 120.

Once recalled, the user views primary image 110, locates an object on the image such as a manhole, places an icon/link 130 on the transparent layer 120 and attaches the address of the corresponding recalled data to link 130. This link location and address information is stored in link database 80 as discussed above in step 208 for future viewing so that when primary image 110 is recalled at step 210, the corresponding transparent layer 120 and links 130 can be viewed together as layered image 100.

Figure 6:
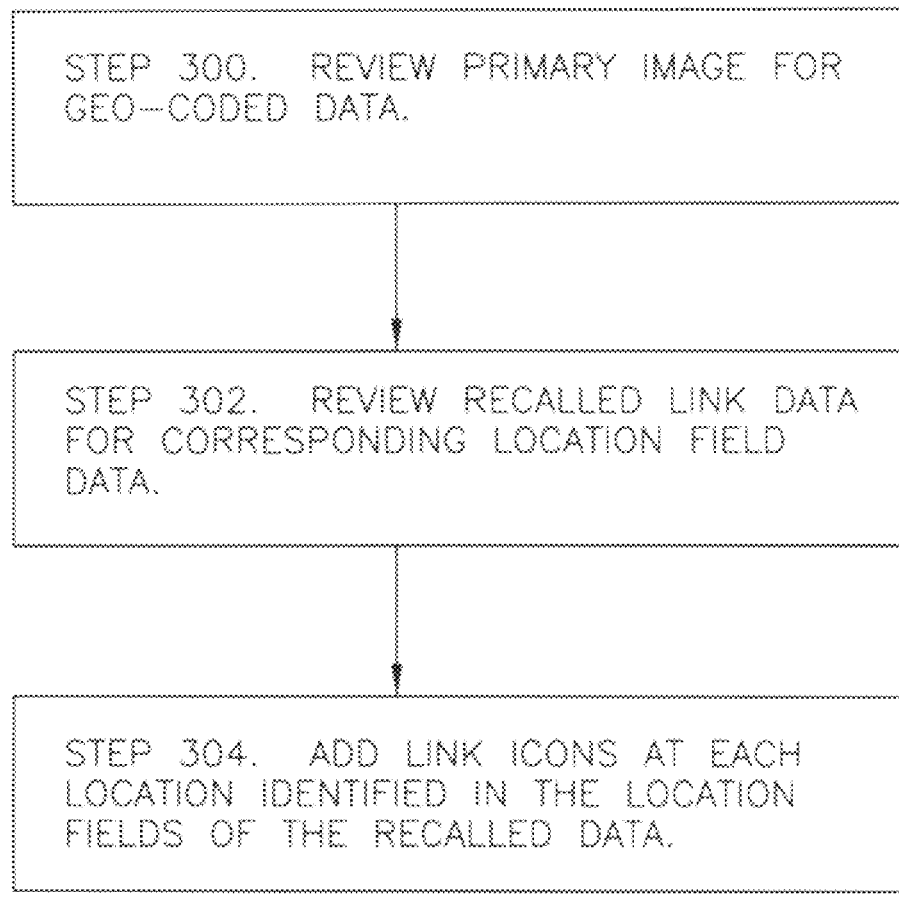
FIG. 6 is a subroutine flow chart for automated link generation from FIG. 4, in accordance with one embodiment of the present invention.

However, in the event that primary image 110 maintains either vector data or some other geocoding such as latitude/longitude data, it is possible to have content rendering module 50 automatically place links 130 on transparent layer using such data. The flow chart of FIG. 6 illustrates this process which is a sub-process of step 206 from FIG. 3. For example, in one embodiment of the present invention, at a first step 300, the recalled primary image 110 is reviewed for location parameters and the rendered transparent layer 120 is coordinated to have identical location parameters. The location parameters of primary image 110 are obtained using the geocoding embedded in primary image 110.

Next at step 302, the corresponding retrieved data from data sources is also reviewed for location data. For example, in the above arrangement, primary image 110 utility map is geo-coded with latitude longitude information. Furthermore, the manhole text data each contain a latitude longitude field as well. Thus, at step 304, content rendering module 50 simply reads the list of recalled data from data sources 20, and places a link image 130 on each location on transparent layer 120 relating to the information from each of the recalled location fields. Obviously, this process is expandable to any geo-coded primary image 110 and any links 130 that maintain a data field with corresponding geo-coded information.

Turning now to typical implementations of system 10, the following are samples of viewing layered images 100, as stored in system database 80 and data sources 20 according to the processes outline above and as further illustrations of step 210 above.

Figure 7:
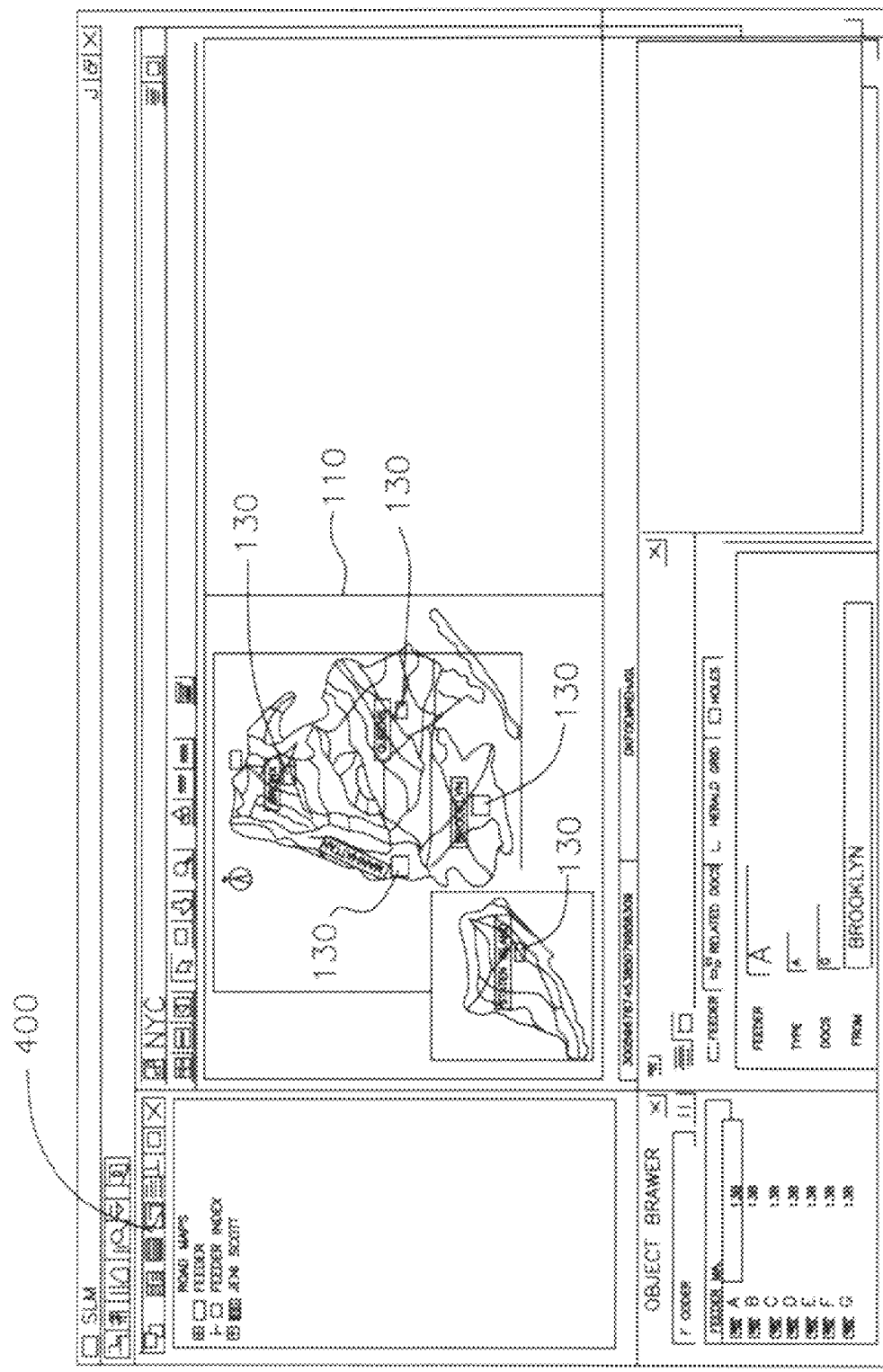
FIG. 7 is a screen shot of a primary image and links generated by the system from FIG. 1, in accordance with one embodiment of the present invention.

In one embodiment of the present invention as illustrated in screen shot FIG. 7, a utility company may for example employ system 10 in order to maintain an integrated data network including all of their electric grid, steam grid and gas grid, employing system 10 to cross connect all related data images, files, programs, real time sensors, etc. . . . , into a geographically vertically integrated data network. Accordingly, beginning with each desired map, or image file, layered images are generated according to the above process for all data contained in data sources 20, resulting in a complex data structure, allowing a user to easily view any image as a layer image 100, with links 130 to all related data, corresponding to the objects on the corresponding primary image/map 110. This process is done without altering or modifying the underlying documents or changing them from their original format.

Thus, once all the related data is entered according to the process above steps 200-208, at step 210 the user may begin viewing a particular image by retrieving a primary image 110 of map of a city (in this case New York City). In the following example illustrated in successive screen shots, a user may be looking to find a certain electric feeder based on its location physical location and then look for any necessary related information regarding that feeder. Thus once primary image 110 of New York City is retrieved, transparent layer 120, overlaid over primary image 110 (not shown as it is transparent) resulting in a layered image 100 having five links 130 thereon, one for each Borough. In this case, each link 130 is a link to another map file for the particular borough.

Tree links window 400, shown in screen shot FIG. 7, includes a link tree of all of the available links 130 that may be associated with the primary image 110 currently being viewed. Obviously, because primary image 110 here is map of the entire city, every available link in the city is somehow be related to this map. Currently in the view shown, only the five links 130 to other borough maps are shown.

Typically, a filter arrangement is applied so that only the desired links are shown. Such a filter is applicable to all layered images 100 discussed throughout. This filtering mechanism allows the user to view as many or as few links 130 as desired.

Figure 8:
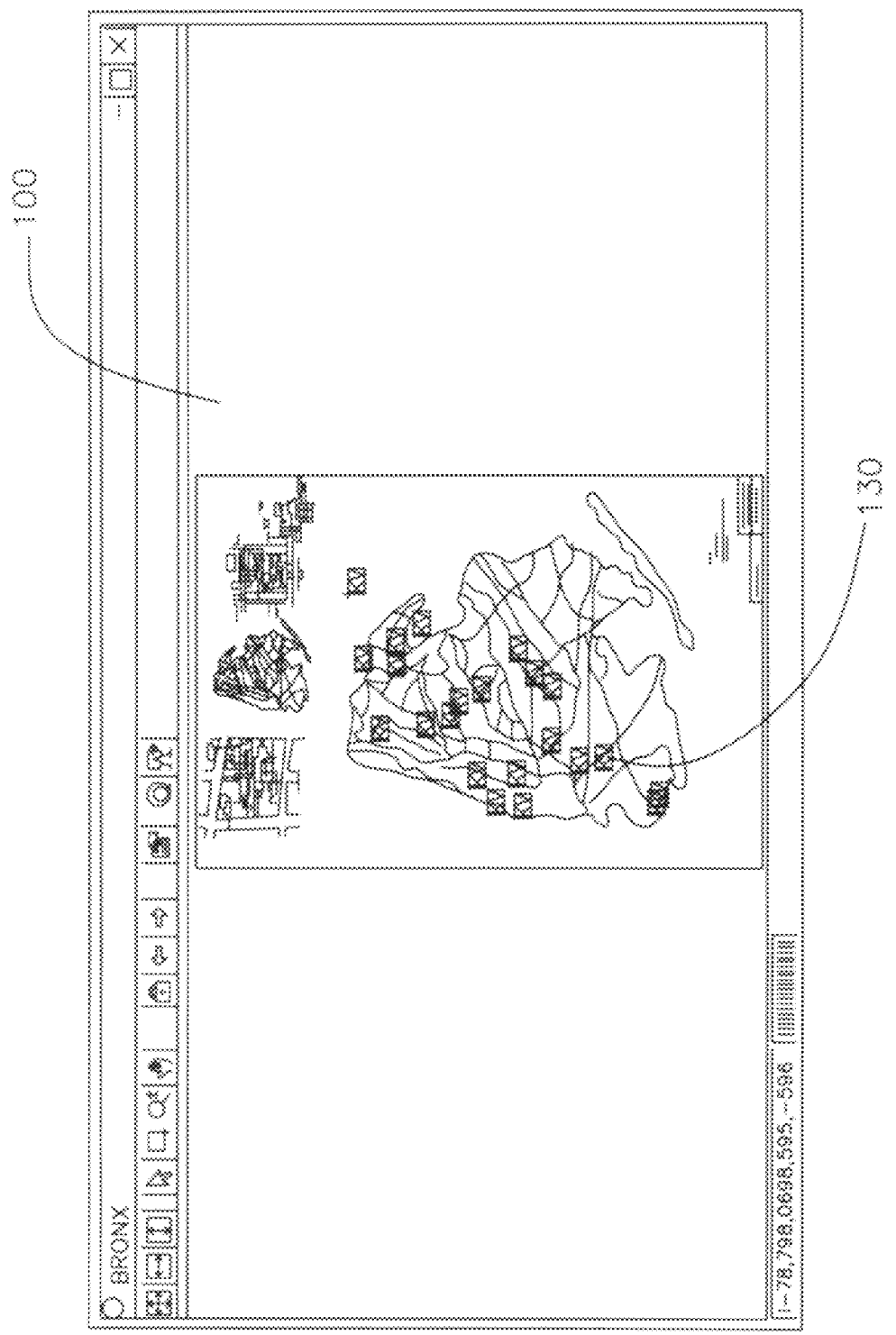
FIG. 8 is a screen shot of a primary image and links generated by the system from FIG. 7, in accordance with one embodiment of the present invention.
Figure 9:
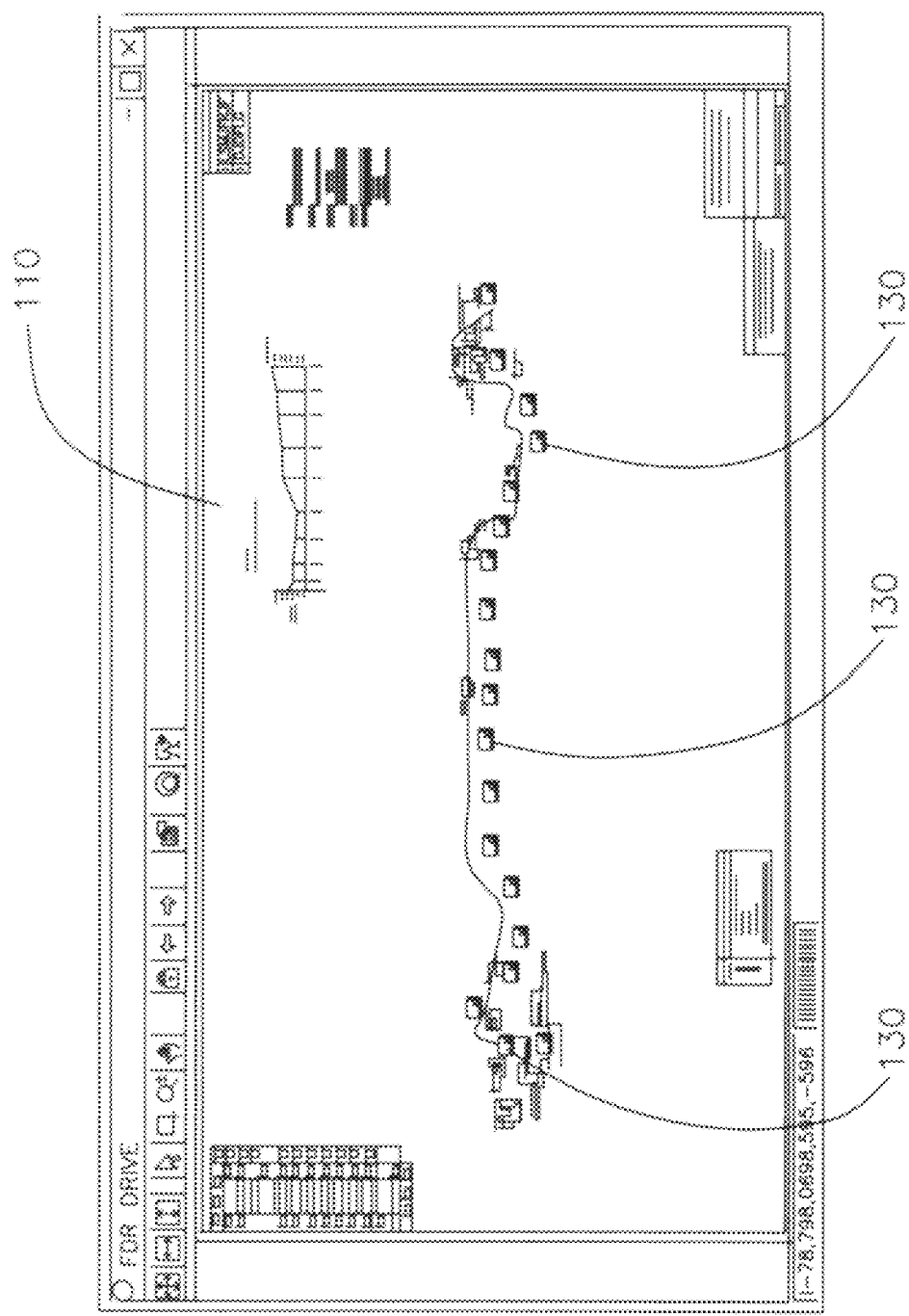
FIG. 9 is a screen shot of a primary image and links generated by the system from FIG. 8, in accordance with one embodiment of the present invention.

Further, object browser 402, also illustrated in screen Shot FIG. 7, allows a user to work from the links 130 up, rather than from primary images down. For example, the screen shot FIGS. 7-12 illustrate a process whereby user is using the layered image 100 maps as a means for navigating down to a particular location (in this case a feeder in Brooklyn), to view links 130 associated with that location. However, using object browser 402, if the actual object name such as "feeder XYZ" is already known, and the user wishes to skip directly to that object, then can simply select that link 130 from object browser 402 and system 10 will recall layered image 100 of that feeder map (FIG. 9, discussed below).

Returning to the screen shot FIG. 7, assuming a user clicked on the link 130 for the borough of Brooklyn, viewing module 70 of system 10 recalls the borough map of Brooklyn, as a primary image 110, with the associated transparent layer 120, and each of the links 130 corresponding to some electrical grid component. Thus, screen shot FIG. 8 shows a layered image 100 that includes a primary image 110 of Brooklyn, a transparent layer 120 and a links 130 related to electrical feeder information. In this instance the filter arrangement is set to show only feeders, but obviously additional links in the borough of Brooklyn are available if desired.

The user can next click on a desired link 130 exhibited on layered image 100 shown in FIG. 8, which in turn recalls a CAD drawing primary image 110 of the underground feeder map for the feeder selected, with associated link images 130 shown on the superimposed transparent layer 120. This is shown in the layered image 100 on screen shot FIG. 9. As with all of these images the links and transparent layer data are recalled from system database 80 and the primary image 110 is recalled from the user's data sources 20.

Figure 10:
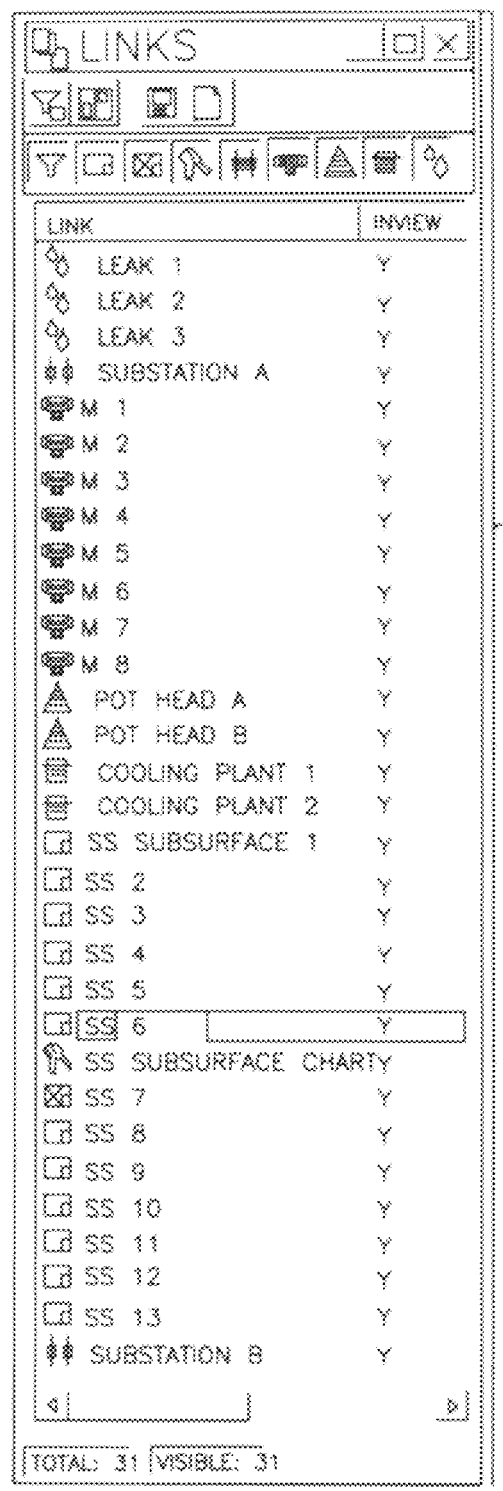
FIG. 10 is a screen shot of a links icon menu generated by the system from FIG. 9, in accordance with one embodiment of the present invention.

At this stage of this process of moving graphically down through files using the link images as shown in FIGS. 7 -9, a link box 404 may always be recalled listing all of the links 130 that are present on any given layered image 100. Screen shot FIG. 10 shows a sample links dialog box 404. This links dialog box can be recalled on any screen shot illustrated previously (FIGS. 7-9) or hidden as standard with typical dialog boxes in Windows™. Here links 130 may be to any type of relevant data in data sources 20 that correspond to objects on primary image 110. For example, the links 130 may be to raster images of a particular portion of the feeder, photograph scans of portions of the feeder, work history text files, related non electrical links (such as nearby water and steam pipes), pot heads, transformers and the like.

Figure 11:
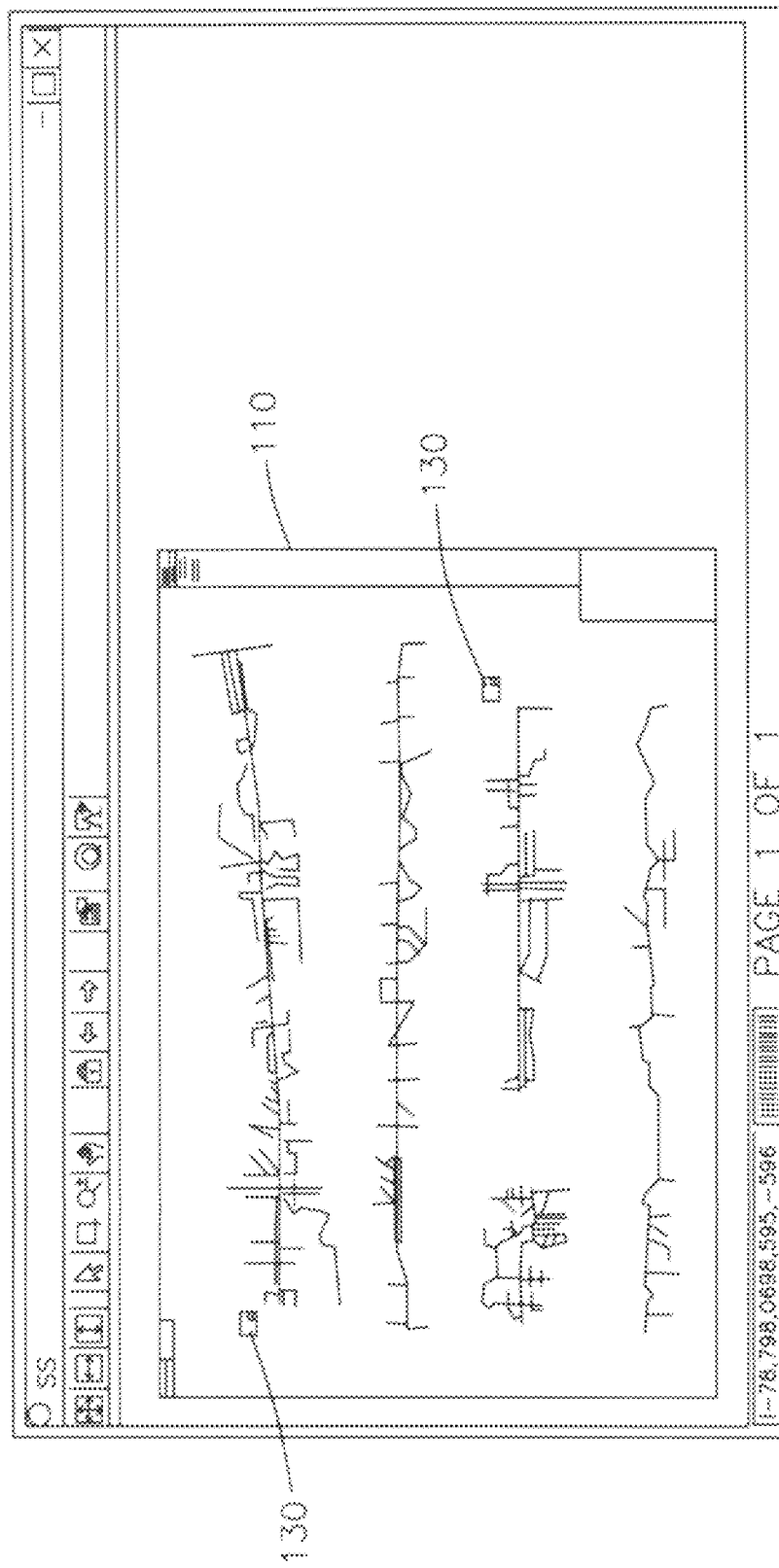
FIG. 11 is a screen shot of a primary image and links generated by the system from FIG. 9, in accordance with one embodiment of the present invention.
Figure 12:
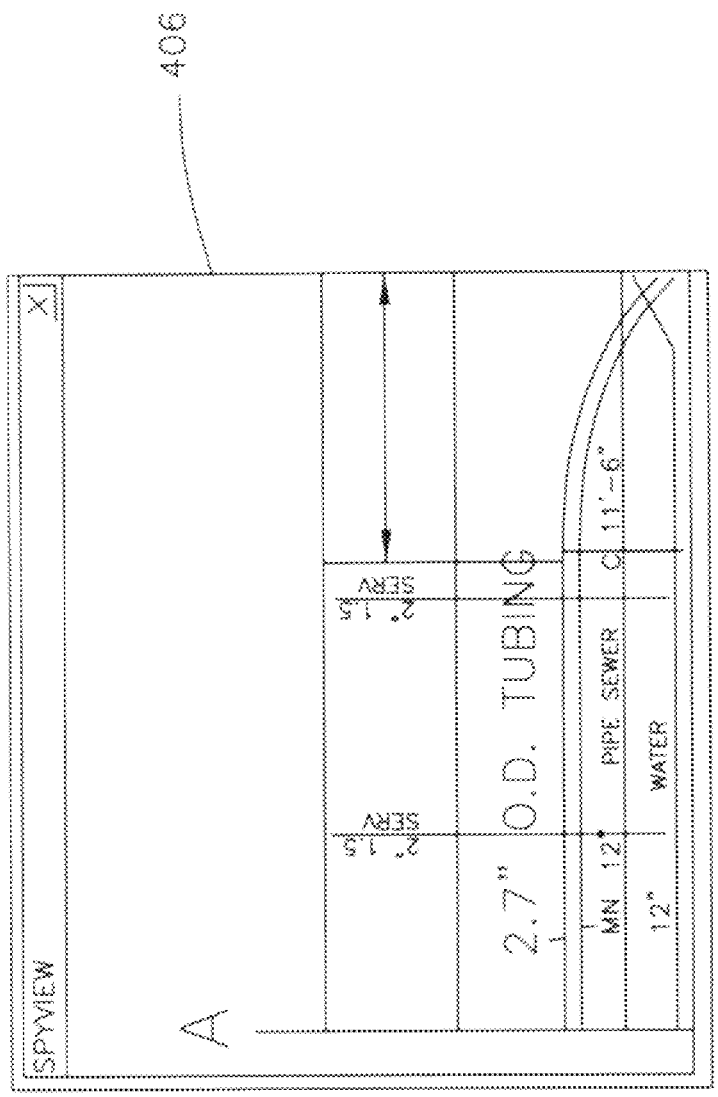
FIG. 12 is a close up screen shot of a primary image and links generated by the system from FIG. 11, in accordance with one embodiment of the present invention.

If the user were to link to a particular raster image from screen shot FIG. 9, a new screen shot FIG. 11 is recalled displaying the raster image as a layered image 100, again with any stored links 130 superimposed via transparent layer 120. Links 130 on this image may be to related raster images such as the adjacent (geographically speaking) raster image of the feeder's blueprint based on match lines. A spy view feature window 406 is shown in screen shot FIG. 12, relating to an expanded view window from a portion of screen shot FIG. 10.

Thus, as described above, the present invention allows for the integration of legacy data from data sources 20 without the need to modify or re-configure primary images 110, simply creating layered image 100, by superimposing transparent layer 120 and associated links, storing this link data in system database 80, to be recalled upon retrieval of the primary image 110.

The present invention has many other applications in the utility field. For example, in a power plant, such as a nuclear power plant, various valves and switches must be managed in related groups and sequences, rather than individually. The present invention provides a solution with the storage of relationships between the icons on such switches and valves on the engineering drawings from the plant, without editing the underlying primary image 110 files such as the piping blueprints.

The information obtained from the spatial interrelationship between various link icons 130 greatly improves the management ability of a number of other third party software as well. It can be used to direct the manner in which information in a linked third party project is used. Third party work order and work management software typically provide schedules for managing individual projects. However, they do not routinely take into consideration potential spatial conflicts, based on the proximity of multiple projects. The present invention has the ability to identify spatial conflicts and to allow for the modification of these schedules and work plans accordingly.

For example, a utility company may maintain a map (primary image 110) of a given street intersection, with the map marking locations (links 130) of manholes or other similar work locations. Each of the manholes may house a number of services such as gas, electric telephone etc. . . . . . The utility company may further maintain third party scheduling software which it uses to schedule service work for each of its departments. Typically each department, although using the same utility company maps, employs different scheduling software.

Using the present invention, the single map of the street intersection (primary image 110) and manholes may be entered into the system with an associated non-embedded transparent layer 120. On the transparent layer 120 over each manhole, links 130 may be placed to each one of the associated scheduling programs for each of the departments that use that particular manhole. In fact, photographs or other digitally stored images of the area may also be linked on transparent layer 120 to assist crews in locating concealed or awkwardly placed work locations, such as partially hidden manholes.

In a first instance in the prior art, a gas department of a utility company may dig up a particular location to replace a gas line and then close the area after completion. Separately, the electric department of the same utility company may then schedule a repair on an electrical conduit in nearly the same location for two months later. This will require them to re-dig the area and re-fill the area after completion.

Using the present invention, the gas department and electric department may activate the related links 130 for a given work area and be directed to the different scheduling programs for the other departments. Here the gas and electric departments will be aware of each others dig in the same location and may be able to avoid duplicate work, by scheduling their respective jobs within quick succession of one another, thereby reducing overhead.

In a second instance, in the prior art, if the gas department schedules a service for a first manhole, and the electric department, using a separate program schedules a service for the same manhole on the same day, there would be no way to prevent physical work conflicts.

Thus, when a first department schedules a service on a given manhole, the link 130 to that scheduled service appears on the transparent layer 130. If a subsequent department then needs to schedule service on the same manhole they can simply consult the layered image 100 map of the street intersection and check the links 130 on the manhole which they need to service. If there is already a link 130 to another departments scheduling software they can open the link 130, check that schedule date and then set up their own service for a different date, adding a corresponding link 130.

Thus, without the need to integrate scheduling software, an expensive proposition, the utility company, may use the present invention to simply input their system maps, and allow different departments to add links 130 to avoid scheduling conflicts or otherwise coordinate scheduled work projects to reduce duplicate work.

In one embodiment of the present invention, another example of a use for system 10 is to dynamically track sensor data from data sources 24. For example, in a factory or plant valve status sensors can be used to provide updated information to dynamic data sources 24, such as pressure or flow rate. A user of system 10 may generate a layered image 100, by first recalling a primary image 110 such as a plant pipe blueprint. Next, using the process outlined above in steps 200-210, the user may drop links 130 on transparent layer 120 over each of the given valves on primary image 110. Here link 130 is attached to the dynamic sensor data in data sources 24. Periodically, event module 90 of content rending module 50 may ping data source 24 for that link 130 for the update valve information (flow rate, etc. . . . ). This updated data can simply be attached to link so that the data is fresh or, alternatively the icon representing link 130 may actually change shape, color, flash, or otherwise generate an alert should the sensor reading exceed some predetermined threshold. A similar arrangement may be useful using temperature sensor data in a utility company setting.

Yet another example of a use for system 10 is to dynamically track the location of an object from data sources 26. For example, in a warehouse or shipping yard setting, location monitors may be employed in certain objects such as shipping containers or crates. A user of system 10 may generate a layered image 100, by first recalling a primary image 110 such as a shipping yard map, or warehouse diagram. Next, using the process outlined above in steps 200-210, the user may drop links 130 on transparent layer 120 over each of the given objects on primary image 110. Here link 130 is attached to the location sensor data stored in data sources 26 for that particular object. Periodically, event module 90 of content rending module 50 may ping data source 26 updating the location of the object. As a result, the icon representing link 130 moves on transparent layer 120 registered over primary map or floor plan image 110. A similar arrangement may be used to track location of people (emergency personnel) or elevators vertically within a building.

With both examples, an original primary image 110 may be converted into a layered image 100 adding links 130, without the need to alter or reprocess the original primary image 110. This is particularly advantageous with blue print images or other drawing images that do not readily allow modification in the original form.

In another embodiment of the present invention, it is further contemplated that system 10 may be configured to dispose a transparent layer 120 over a primary image 110 creating a layered image 100 where the transparent layer 120 and links 130 thereon are generated over a first primary image 110, and then later re-scaled and viewed over a second primary image 110 that was not the original primary image used when generating the links. For example, in the case where two different departments from the same utility (eg. electric and gas) each have a map of the same geographic area, typically they each generate their own layered image 100 over the their own primary image 110 as stored in their data source 20. However, in the even that the first department (gas) would like to see certain links 130 (eg. electric manholes) superimposed as a layer image 100 over their own gas department map primary image 110, system 10 may be configured to generate a layered image 100 by placing a transparent layer 120, originally created with electrical links 130 over an electric department map primary image 110, over the primary image 110 from the gas department, allowing them to view electric manhole links 130 on their own primary image 130 without the need to manually add all of those links 130 from the electric department data sources 20 in addition to their own gas links 130.

Similar viewings of transparent layers 120 generated over a first primary image 110 may be viewed over a second primary image 110 in other applications as well. In the case of intelligent primary images 110 (GIS etc. . . . ) the transparent layer 120 can be refitted and registered using the embedded data in primary image 110. However, when primary image 110 is non-intelligent, viewing integration module 70 of system 10 may be required to either temporarily rescale the transparent layer 120 or the second primary image 110 so that the images may be appropriately registered to one another resulting in links 130 being disposed over their correct geographic location on the second primary image 110.

Thus, from the above description it can be seen that the uses for the present invention are very broad. For example, the present invention may be used in the fields of infrastructure, facility and asset management for homeland security and emergency response or simply to improve productivity, accuracy and decision support in the operations, maintenance and modification of such resources. The underlying primary document image 110 can be a map, floor plan, elevation, section, chart, workflow, photo or a schematic. Entities that own and/or manage such assets are:

Production Plants
1. Energy Generation (Nuclear, Fossil, Hydro)
2. Chemical
3. Other Discrete and Process Manufacturing
4. Water Supply and Waste Water Treatment
Transmission, Distribution and Collection
1. Energy (Electricity, Gas, Steam)
2. Communications (Voice, Data, Etc.)
3. Water and Sewerage
Information Technology
1. Processing
2. Storage
3. Networks
Transportation
1. Rail
2. Roads
3. Subways
4. Waterways
5. Air
Government
1. Civil
2. Military
Hospitals and Other Medical Facilities In one embodiment of the present invention, another example of a possible use for system 10 is in the manufacturing process for a particular product. For example, typical fabrication processes for a manufactured product are designated by a workflow, where each step relates to a certain process that may be handled by different departments/divisions within the plant. A user of system 10 may recall a high level work flow diagram as primary image 110 and then add links 130 on a registered transparent layer 120. Here links 130 can be placed over the appropriate objects on primary image 110 such as over certain work stages in the work flow. Links 130 in this case would then link to either data such as exemplary images or instructional diagrams for that stage of the workflow or other executable programs that assist in a particular stage of the manufacturing process, each from various non-compatible data sources 20 within the company.

Yet another example of a possible use outside the field of commercial industrial use would be in the field of workflow management in the finance industry. Financial institutions frequently employ work flows that employ data and programs from various departments within a particular institution. However larger companies frequently have different IT structures between departments, making embedded and integrated work flow management difficult, costly and in some cases impossible. A user of system 10 may recall a high level work flow diagram as primary image 110 and then add links 130 on a registered transparent layer 120. Here links 130 can be placed over the appropriate objects on primary image 110 such as over certain work stages in the work flow. Links 130 in this case would then link to either data or other programs on various non-compatible data sources 20 within the company.

It is understood that the above list is intended to be exemplary and that the present invention may also be applied to a wide range of other types of images and industries. For example, the underlying image can be a human body scan and links could be made from locations on the body to reports, test results and other information related to the specific locations on the patient's body, where ever these linked document and data are located, within a organization or across the web.

The benefits of the present invention approach are numerous. First, one does not need to work with the native file format of the primary image document 110 that is being overlain, so it becomes quite easy to work on top of any primary image 110 document type including raster scans of any image (text, charts, drawings, photos, schematics, etc.), computer aided design (CAD), geographic information system (GIS), word processing, spreadsheet, etc. files, as long as that image can be viewed by a third party viewing software product.

As noted above, standard Computer Aided Design and Geographic Information Systems typically require a vector rather than a raster format for drawings and maps to be used. In contrast, the present invention works with any viewable document type regardless of the way the information is embedded in it (e.g. vector with ASCII text) The cost of converting raster documents into intelligent vector, word and spreadsheet documents is significant, so solutions that rely on such documents become prohibitively expensive to implement. In contrast, the present invention is implemented quickly and with a much lower cost.

Also with the present invention, links are made into multiple information sources including legacy information, making it possible to integrate various information sources without having to replace current systems and transform current information in the form of documents and data. Traditional integration solutions rely on replacement of current software applications with already integrated alternatives as in the case of Enterprise Resource Planning (ERP) solutions, or on very costly, time consuming integration code that must be written to get separate application software and associated data to work together. Rather, the present invention without that "tight" integration of traditional solutions, still provides a cost effective alternative solution.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for integrating disparate data sources comprising:
   a plurality of data sources each including a plurality of technical documents related to existing infrastructure or facilities, the plurality of technical documents including at least one file containing a plurality of objects, each object relating to information in at least one of the plurality of data sources;

a computer configured to, without modifying the plurality of technical documents,
(i) generate a digital overlay document having a plurality of icons in response to a user's selection of a file, each icon representing existing infrastructure or facilities equipment and components and linking to information in at least one of the plurality of data sources relating to an object in the user-selected file,
(ii) superimpose the digital overlay document over the user-selected file and spatially register the digital overlay document to the user-selected file such that each icon superimposes an object relating to the information that the icon links to, and such that the digital over-lay document is separate from and not embedded within the user-selected file, and
(iii) store the digital overlay document in a database separate from the plurality of data sources;

a display presenting the user-selected file superimposed with the digital overlay document; and software that, in response to the user's subsequent selection of an icon, retrieves the information that the user-selected icon links to, wherein the display subsequently presents the retrieved information.

2. The system of claim 1, wherein the information that the user-selected icon links to comprises one of the plurality of technical documents.

3. The system of claim 2, wherein the information that the user-selected icon links to comprises a file containing a plurality of objects.

4. The system of claim 3, wherein the digital overlay document is updated in response to one or more subsequent changes to at least one object in the user-selected file, the one or more subsequent changes to the at least one object corresponding to one or more changes in the existing infrastructure or facilities.

5. The system of claim 4, wherein at least one icon is added, modified, or deleted in response to one or more subsequent changes to at least one object in the user-selected file.

6. The system of claim 5, wherein at least one icon is modified to link to different information in at least one of the plurality of data sources in response to one or more subsequent changes to at least one object in the user-selected file.

7. The system of claim 6, wherein the digital overlay document is stored as one of the plurality of technical documents.

8. The system of claim 7, wherein the plurality of technical documents relate to existing infrastructure or facilities including a power plant, an electric company, a gas company, a steam company, a communications company, a transportation company, a government entity, a medical facility, a discrete or process manufacturing facility, a data center, a trading floor, or an office building.

\* \* \* \* \*